US012676360B2

(12) United States Patent
Tushar et al.

(10) Patent No.: US 12,676,360 B2
(45) Date of Patent: Jul. 7, 2026

(54) BATTERY THERMAL MANAGEMENT

(71) Applicant: TVS MOTOR COMPANY LIMITED, Chennai (IN)

(72) Inventors: Rameshwar Parate Tushar, Chennai (IN); Nileshwar Pramila Rao, Chennai (IN); Dhinagar Samraj Jabez, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 808 days.

(21) Appl. No.: 18/014,695

(22) PCT Filed: Oct. 12, 2020

(86) PCT No.: PCT/IN2020/050874
§ 371 (c)(1),
(2) Date: Jan. 5, 2023

(87) PCT Pub. No.: WO2022/018739
PCT Pub. Date: Jan. 27, 2022

(65) Prior Publication Data
US 2023/0253646 A1 Aug. 10, 2023

(30) Foreign Application Priority Data
Jul. 23, 2020 (IN) .............................. 202041031643

(51) Int. Cl.
*H01M 10/6551* (2014.01)
*H01M 10/653* (2014.01)
(Continued)

(52) U.S. Cl.
CPC ..... *H01M 10/6551* (2015.04); *H01M 10/653* (2015.04); *H01M 50/213* (2021.01);
(Continued)

(58) Field of Classification Search
CPC ........... H01M 10/6551; H01M 10/653; H01M 50/213; H01M 50/291; H01M 50/51;
(Continued)

(56) References Cited

U.S. PATENT DOCUMENTS

2018/0131054 A1* 5/2018 Waid ................... H01M 10/659

FOREIGN PATENT DOCUMENTS

| CN | 101950814 A | * | 1/2011 | ........ H01M 10/4207 |
| CN | 102664292 A | | 9/2012 | |

(Continued)

OTHER PUBLICATIONS

International Search Report issued in corresponding International Application No. PCT/IN2020/050874; mailed May 20, 2021 (6 pages).

(Continued)

*Primary Examiner* — Kaity V Chandler

(74) *Attorney, Agent, or Firm* — Osha Bergman Watanabe & Burton LLP

(57) ABSTRACT

A battery module includes: a plurality of cells positioned in a plurality of rows enclosed within a casing, each of the plurality of cells includes at least a first plurality of cells and a second plurality of cells; and a thermal barrier assembly encapsulating the plurality of cells in the plurality of for thermal management of the plurality of cells. The thermal barrier assembly includes: at least one partition structure in thermal contact along a length of at least one row of the plurality of rows for extracting heat from the first plurality of cells, and at least one heat dissipating structure positioned proximal to at least one end of the at least one partition structure and thermally coupled to the at least one partition structure for dissipating the extracted heat away from the plurality of cells in the plurality of rows.

37 Claims, 8 Drawing Sheets

(51) Int. Cl.
 *H01M 50/213* (2021.01)
 *H01M 50/291* (2021.01)
 *H01M 50/51* (2021.01)
 *F28D 21/00* (2006.01)

(52) U.S. Cl.
 CPC ......... *H01M 50/291* (2021.01); *H01M 50/51* (2021.01); *F28D 2021/0029* (2013.01)

(58) Field of Classification Search
 CPC ........... H01M 2220/20; H01M 10/643; H01M 10/6555; H01M 10/6562; H01M 10/6566; H01M 10/658; H01M 10/66; H01M 50/293; H01M 10/625; H01M 10/613; F28D 2021/0029; Y02E 60/10
 See application file for complete search history.

(56) References Cited

FOREIGN PATENT DOCUMENTS

| | | | | | |
|---|---|---|---|---|---|
| CN | 205960164 U | * | 2/2017 | ............. | Y02E 60/10 |
| CN | 206301860 U | * | 7/2017 | ............. | Y02E 60/10 |
| CN | 206497928 U | * | 9/2017 | ........ | H01M 10/6551 |
| CN | 206639823 U | * | 11/2017 | ............. | Y02E 60/10 |
| CN | 207459129 U | * | 6/2018 | ............. | Y02E 60/10 |
| CN | 108306075 A | * | 7/2018 | ........ | H01M 10/6567 |
| CN | 109830625 A | * | 5/2019 | ............. | Y02E 60/10 |
| CN | 209515768 U | * | 10/2019 | ............. | Y02E 60/10 |
| CN | 209561583 U | * | 10/2019 | ............. | Y02E 60/10 |
| CN | 111063836 A | * | 4/2020 | .......... | H01M 10/613 |
| CN | 210379155 U | * | 4/2020 | ............. | Y02E 60/10 |
| CN | 210489658 U | * | 5/2020 | ............. | Y02E 60/10 |
| CN | 210866249 U | * | 6/2020 | ............. | Y02E 60/10 |
| CN | 210897547 U | * | 6/2020 | ............. | Y02E 60/10 |
| CN | 211017205 U | * | 7/2020 | ............. | Y02E 60/10 |
| WO | 2020102235 A1 | | 5/2020 | | |

OTHER PUBLICATIONS

Written Opinion of the International Searching Authority issued in corresponding International Application No. PCT/IN2020/050874; dated May 20, 2021 (8 pages).

* cited by examiner

100

101

102

BATTERY THERMAL MANAGEMENT

TECHNICAL FIELD

The present subject matter relates to a battery module. More particularly and not exclusively, it pertains to heat dissipation in the battery module.

BACKGROUND

In recent years, rechargeable energy storage devices have been widely used as an energy source for a number of electronic and electrical units, hybrid and electric vehicles. Commonly used rechargeable energy storage devices include, for example, nickel cadmium batteries, nickel hydrogen batteries, nickel zinc batteries, and lithium rechargeable batteries. Lithium rechargeable energy storage devices are predominantly used in electric and hybrid vehicles because they are rechargeable, they can be made in a compact size with large capacity, they have a high operation voltage, and they have a high energy density per unit weight.

An existing energy storage device comprises one or more energy storage cells, such as, lithium ion battery cells enclosed within a casing. The electrochemical reactions with the lithium ion battery cells are responsible for the voltage and the current generated by the energy storage device. Also, during charging of the energy storage device, electrochemical reactions occur within the lithium ion battery cells. These electrochemical reactions are highly exothermic and the lithium ion battery cells tend to heat up during the course of normal operation. The increased temperatures of the lithium ion battery cells degrade the electrical performance of the energy storage device and may lead to catastrophic failure of the energy storage devices.

The energy storage device comprising the lithium ion battery cells finds application as an energy source in electric vehicle or a hybrid electric vehicle. The energy storage device in the electric or hybrid electric vehicle requires cooling for continuous performance and durability with good health of the lithium ion battery cells. Range of the vehicle reduces due to temperature rise of the battery cells. There is probability of thermal runaway in the energy storage device, which may result in propagation of blasting of the cells. Further, charging immediately after riding/ driving the vehicle may not be possible due to temperature rise in the battery module even by using fast charging chargers.

Thus, there is a need to effectively dissipate the generated heat, efficiently cool the lithium ion battery cells of the energy storage device for good performance and longevity as well as arrest propagation of fire if any for the safety of the energy storage device.

BRIEF DESCRIPTION OF DRAWINGS

The detailed description is described with reference to the accompanying figures. The same numbers are used throughout the drawings to reference like features and components.

DETAILED DESCRIPTION OF THE INVENTION

Figure 1:
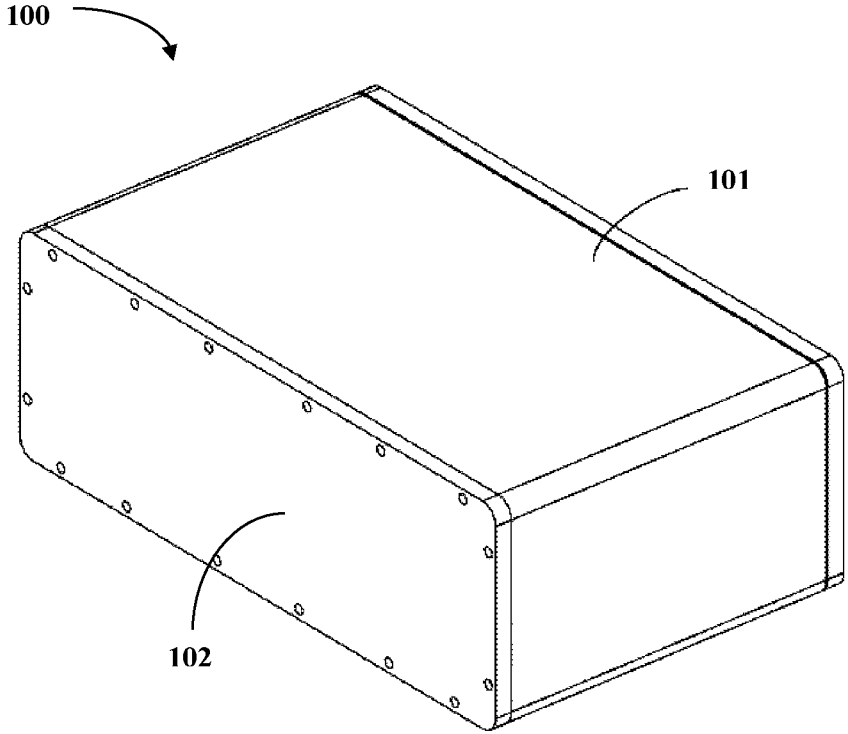
FIG. 1 exemplarily illustrates a perspective view of a battery module, as per an embodiment of the present invention.

In case of drastic increase in temperatures of the cells of the energy storage device, the cells may ignite and cause fire. The material of the housing of the cells and presence of air between the cells and inner surface of the casing may propagate the fire to all the cells in the energy storage device, leading to a catastrophic failure of the energy storage device and the product, such as, a vehicle employing it. Many energy storage devices are provided with a sacrificial member that melts down and creates a space between the cells or rows of cells to arrest propagation of fire. However, probability of the sacrificial member being non-functional at the time of need makes this mechanism not effective. Despite employing the sacrificial member, there still exists a need for extracting heat from individual cells to reduce the probability of drastic increase in the temperatures of the cells.

In an implementation for cooling of the energy storage device, and in turn the lithium ion battery cells, a heat exchange member in thermal contact with the casing of the energy storage device is used and forced convection is employed. The heat dissipated from the lithium ion battery cells has to traverse through air-filled gap between the cells and the casing. The heat transfer between the battery cells and the casing is not efficient since the air is a poor conductor of heat. In order to ensure that heat is effectively dissipated from the battery cells, it is essential to ensure that the heat generating battery cells are reliably secured to be in thermal contact with the heat exchange member proximal to the casing. Another existing implementation employs liquid cooling for thermal management in the energy storage device. The energy storage device as a whole may be immersed into a liquid coolant. However, the liquid coolant is stagnant and efficiency of cooling of the energy storage device is substantially less.

Another implementation of the energy storage device involves employing coolant tubes for a liquid coolant designed around individual battery cells or a cluster of battery cells in the energy storage device. However, insertion of modular coolant tubes within the casing of the energy storage devices makes the energy storage device bulky and no longer compact for space-constrained varied applications. Further, such an insert with coolant channels requires to be sealed efficiently, so as to prevent leakage of the liquid coolant into and outside the energy storage device.

Therefore, there exists a need for an improved design of an energy storage device that is light in weight with efficient and effective heat transfer from the battery cells which additionally provides ease and safety during assembly, use, maintenance, and servicing of the energy storage device while curtailing fire propagation and overcoming all problems disclosed above as well as other problems of known art.

In an embodiment a battery module with a thermal barrier assembly is disclosed. The battery module comprises a plurality of cells positioned in a plurality of rows enclosed within a casing and thermal barrier assembly encapsulating the plurality of cells in the plurality of rows for thermal management of the plurality of cells. Each of the plurality of rows comprises at least one cell. The thermal barrier assembly comprises at least one partition structure in thermal contact along a length of at least one row comprising at least one cell for extracting heat from at least one cell and at least one heat dissipating structure positioned proximal to at least one end of the partition structure and thermally coupled to the partition structure for dissipating the extracted heat away from the plurality of cells in the plurality of rows.

In an embodiment, at least one partition structure comprises a first partition structure positioned in thermal contact with a first surface and a second surface proximal to a top end of at least one cell in at least one row and a second partition structure positioned in thermal contact with the second surface and the first surface proximal to a bottom end of at least one cell in at least one row. The first surface and the second surface of at least one cell are diametrically opposite and together define an external periphery of the cell. In another embodiment, at least one cell is a first plurality of cells positioned in one of the plurality of rows and adjacent cells in the first plurality of cells are separated by the first partition structure and the second partition structure for preventing thermal contact between the adjacent cells. Each of the first partition structure and the second partition structure has a serpentine profile with a contour conforming to the first surface and the second surface of the adjacent cells. Each of the first partition structure and the second partition structure comprises a series of alternating crests and troughs to establish thermal contact with the first surface and the second surface of the adjacent cells. Each of the first partition structure and the second partition structure further comprises a flat section between each pair of a crest and a trough for good surface contact and assembly of the cells in thermal contact with the each of the first partition structure and the second partition structure. In an embodiment, each of the first partition structure and the second partition structure further comprises one of silicon and acrylic type thermal pads in the crests and the troughs for enhanced thermal contact with the cells.

The first partition structure extends, along a length, from a top end of the at least one cell till a contact level of the first surface and the second surface and the second partition structure extends, along the length, from a bottom end of the at least one cell till the contact level of the first surface and the second surface, for extracting heat from the first surface and the second surface from the each of the first plurality of cells. In an embodiment, the contact level corresponds to a substantially mid-level of a height of the at least one cell. In an embodiment, substantially a one-half of the first surface is in thermal contact with one of the first partition structure and the second partition structure and substantially a second-half of the second surface is in thermal contact with one of the second partition structure and the first partition structure, respectively. In an embodiment, the first partition structure and the second partition structure are made of a composite with a thermal conductivity in a range from about 700 W/mK to about 100 W/mK along its length In an embodiment, the thermal barrier assembly further comprises at least one thermal shield with a substantially serpentine profile in contact with at least one partition structure and at least one cell and extending along the length of at least one row for thermally insulating at least one cell in at least one row from the plurality of cells in the plurality of rows. At least one cell is a first plurality of cells electrically connected in series and positioned in one of the plurality of rows and a second plurality of cells electrically connected in parallel and positioned in an adjacent row. The thermal shield is positioned between the first plurality of cells and the second plurality of cells in contact with at least one partition structure of each of the first plurality of cells and the second plurality of cells and the each of the first plurality of cells and the second plurality of cells for arresting propagation of heat extracted as well as fire from the first plurality of cells towards the second plurality of cells. The thermal shield extends till at least one heat dissipating structure positioned proximal to at least one end of at least one row of the plurality of cells and is coupled to at least one heat dissipating structure.

In an embodiment, the at least one thermal shield separates a series connected cell pack from one of adjacent cells and adjacent cell packs. In an embodiment, the at least one thermal shield is thermal conducting on one side and thermal insulating on an opposite side. In an embodiment, the at least one thermal shield is thermal conducting in along a length of the at least one thermal shield and thermal insulating towards a thickness of the at least one thermal shield. The thermal shield is one of a sheet made of an inorganic compound, an insulation foam, and a polymer membrane. In an embodiment, the at least one thermal shield is a sheet made of aluminium magnesium silicate with a high melting point of about 1300° C. to about 1900° C. In an embodiment, a thickness of the at least one thermal shield is about 3 mm to prevent fire propagation to about 3 rows of cells with minor damages to cells in the battery, while output voltages of the cells remain undisturbed.

At least one heat dissipating structure comprises at least one airflow guide on a front surface in contact with air within the casing and a planar rear surface thermally coupled to at least one partition structure and at least one thermal shield. The heat dissipating structure further comprises at least one extension member extending from the planar rear surface for removably engaging with ends of at least one partition structure and at least one thermal shield. The battery module further comprises at least one cell holder for holding and structurally supporting the plurality of cells in position.

In another embodiment, a thermal barrier assembly for a battery module is disclosed. The thermal barrier assembly comprises a first partition structure with a serpentine structure conforming and in thermal contact with a first surface and a second surface of a first plurality of cells of the battery module for extracting heat from the first surface and the second surface of the first plurality of cells. The thermal barrier assembly further comprises a second partition structure with a serpentine structure conforming and in thermal contact with the second surface and the first surface of the first plurality of cells for extracting heat from the second surface and the first surface of the first plurality of cells. Each of the first partition structure and the second partition structure comprises a series of alternating crests and troughs with a flat section between each pair of a crest and a trough to establish thermal contact with the first surface and the second surface of the adjacent cells. A thermal shield with a substantially serpentine profile in contact with each of the first partition structure and the second partition structure of the first plurality of cells, a first partition structure and a second partition structure of a second plurality of cells, the first plurality of cells, and the second plurality of cells of the battery module, for thermally insulating the first plurality of cells from the second plurality of cells is provided as a part of the thermal barrier assembly. Further, the thermal barrier assembly comprises at least one heat dissipating structure in thermal contact with the first partition structure, the second partition structure, and the thermal shield for dissipating the extracted heat away from the first plurality of cells and the second plurality of cells.

The first partition structure extends from a top end of each of the first plurality of cells till a contact level of the first surface and the second surface as well as along a length of each of the plurality of cells and the second partition structure extends from a bottom end of each of the first plurality of cells till the contact level of the first surface and the second surface as well as along the length of each of the plurality of cells for extracting heat on the first surface and the second surface from each of the first plurality of cells along the length of each of the first plurality of cells. The contact level corresponds to a substantially mid-level of a height of the each of the plurality of cells. Substantially a one-half of the first surface is in thermal contact with one of the first partition structure and the second partition structure and substantially a second-half of the second surface is in thermal contact with one of the second partition structure and the first partition structure, respectively. The first plurality of cells and the second plurality of cells are positioned in two rows of a plurality of rows within a casing of the battery module. Adjacent cells in the first plurality of cells positioned in one of the two rows are separated by the first partition structure and the second partition structure for preventing thermal contact between the adjacent cells. Each of the first partition structure and the second partition structure comprises a series of alternating crests and troughs with a flat section between each pair of a crest and a trough to establish thermal contact with the first surface and the second surface of the adjacent cells. In an embodiment, each of the first partition structure and the second partition structure further comprises one of silicon and acrylic type thermal pads in the crests and the troughs for enhanced thermal contact with the cells.

The first plurality of cells are electrically connected in series and positioned in one of the two rows and the second plurality of cells are electrically connected in parallel and positioned in an adjacent row to the one of the two rows. In an embodiment, the first partition structure and the second partition structure are made of a composite with a thermal conductivity in a range from about 700 W/mK to about 100 W/mK along its length. In an embodiment, the thermal shield separates a series connected cell pack from one of adjacent cells and adjacent cell packs. In an embodiment, the at least one thermal shield is thermal conducting on one side and thermal insulating on an opposite side. In another embodiment, the at least one thermal shield is thermal conducting along a length of the at least one thermal shield and thermal insulating towards a thickness of the at least one thermal shield.

In an embodiment, the thermal shield is one of a sheet of an inorganic compound, an insulation foam, and a polymer membrane. In an embodiment, a thickness of the thermal shield is about 3 mm to prevent fire propagation to about 3 rows of cells with minor damages to cells in the battery, while output voltages of the cells remain undisturbed.

The heat dissipating structure comprises at least one airflow guide on a front surface in contact with air within the casing and a planar rear surface thermally coupled to the first partition structure and the second partition structure and the thermal shield. The heat dissipating structure further comprises at least one extension member extending from the planar rear surface for removably engaging with ends of the first partition structure, the second partition structure, and the thermal shield.

The present subject matter is further described with reference to accompanying figures. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 exemplarily illustrates a perspective view of a battery module 100, as per an embodiment of the present invention. As exemplarily illustrated, the battery module 100 comprises a casing 101 and a first end cover 102. The casing 101 is a hollow rectangular cover with open ends enclosing multiple cells and other electrical and electronic components, such as, a battery management (BMS) board (not shown) of the battery module 100. End covers, such as, 102 of the battery module 100 close the open ends of the casing 101. The casing 101 has mounting provisions (not shown) to mount the end covers, such as, the first end cover 102 and a second end cover (not shown) at the open ends of the casing 101 using attachment means. The end covers have external electrical connections of the battery module 100 for charging and discharging of the battery module 100. In an embodiment, an outer surface of the casing 101 may comprise a dovetail pattern that facilitates in easy mounting and removal of the battery module 100 in a designated space in a powered device, such as, a vehicle.

Figure 2:
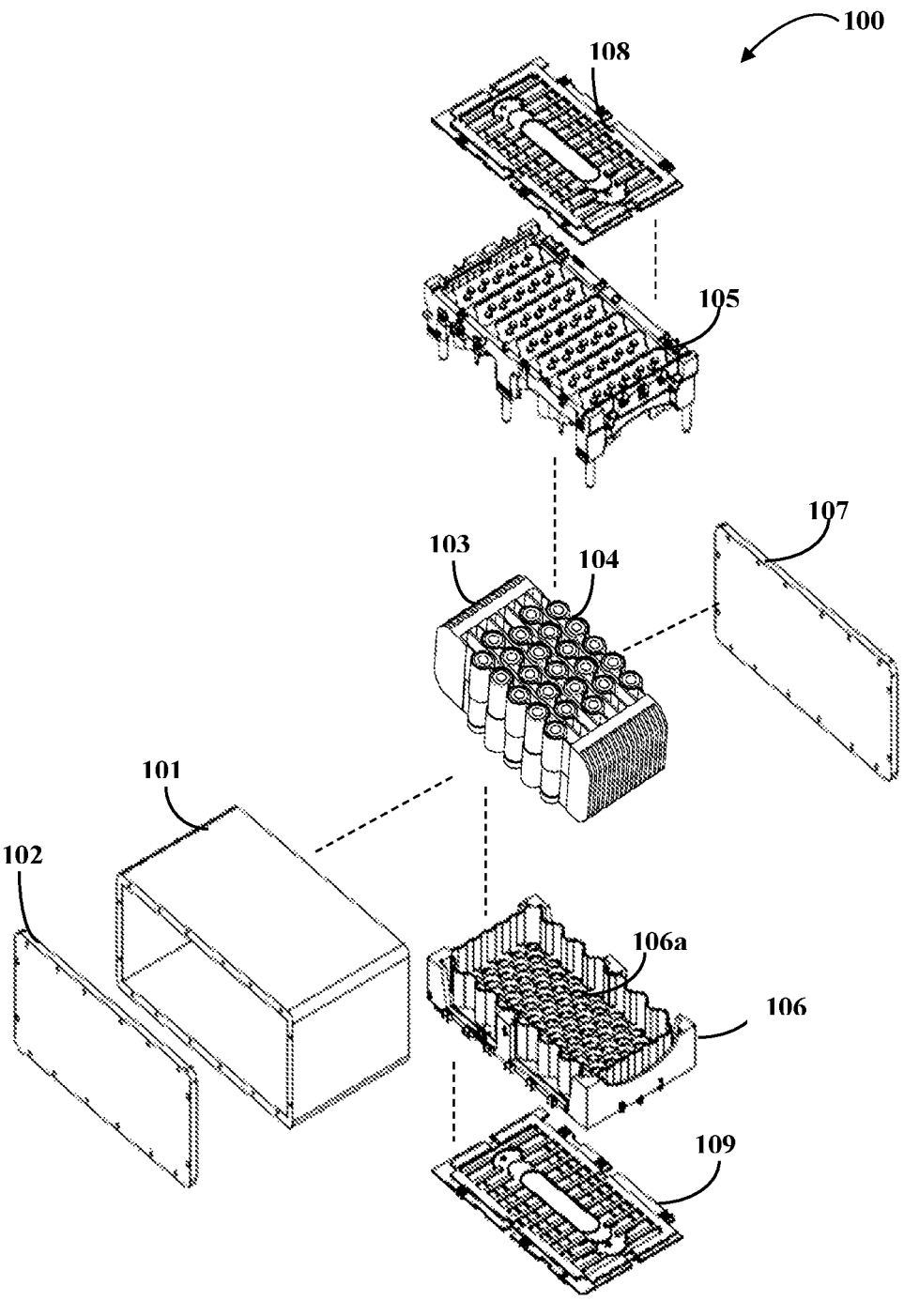
FIG. 2 exemplarily illustrates a partial exploded perspective view of the battery module exemplarily illustrated in FIG. 1.

FIG. 2 exemplarily illustrates a partial exploded perspective view of the battery module 100 exemplarily illustrated in FIG. 1. The battery module 100 comprises multiple cells, such as, 104 in a thermal barrier assembly 103 positioned within the casing 101. The cells 104 are positioned between the cell holders 105 and 106. The cell holders 105 and 106 have mounting provisions for the BMS board (not shown). On one side of the casing 101, the first end cover 102 is provided and on the other side of the casing 101, a second end cover 107 seals the casing 101. The cell holders 105 and 106 have provisions to accommodate and hold the cells 104 in position. Such provisions, referred to as placeholders 106a are evenly distributed annuli in the cell holders 105 and 106 into which the cylindrical cells are inserted. The placeholders 106a may be of different shapes, such as, rectangular, square, hexagonal, etc., based on the shape of the cells 104. The placeholders 106a are evenly distributed in different rows to accommodate the cells 104 in different rows across the surface of the cell holders. 105 and 106. Each row of placeholders 106a may comprise one or more cells, such as, 104. The cells 104 in the placeholders 106a are closely packed from top and bottom by the cell holders 105 and 106. The cells 104 may be connected in series and/or parallel combination using interconnect sheets (not shown).

The cells 104 are encompassed in the thermal barrier assembly 103 of the battery module 100 and positioned in the placeholders 106a. The cells 104 with the thermal barrier assembly 103 are positioned between the cell holders 105 and 106. The thermal barrier assembly 103 extracts and dissipates the heat generated from by cells 104, away from the cells 104. The thermal barrier assembly 103 also prevents propagation of fire to cells 104 in different rows due to increased temperatures or fire. In an embodiment, the casing 101 further comprises openings on side walls for venting the accumulated heat and any gases released from the cells 104 to the outside of the battery module 100. The structure of the thermal barrier assembly 103 is described in the subsequent figures. In addition to the thermal barrier assembly 103, the battery module 100 comprises protective sheets 108 and 109 positioned on the cell holders 105 and 106. These protective sheets 108 and 109 prevent terminals of the cells 104 from coming into direct contact with the casing 101. The electrical connection between the cells 104 is made using interconnect sheet positioned on the cell holders 105 and 106. The terminals of the cells 104 are soldered to the interconnect sheets to connect them in series and parallel. In an embodiment, the protective sheets 108 and 109 is positioned above the interconnect sheets. In an embodiment, the interconnect sheet is absent and the protective sheet, such as, 108 or 109 establishes electrical connections between the cells 104, while also preventing direct contact of the terminals of the cells 104 with an inner surface of the casing 101.

Figure 3:
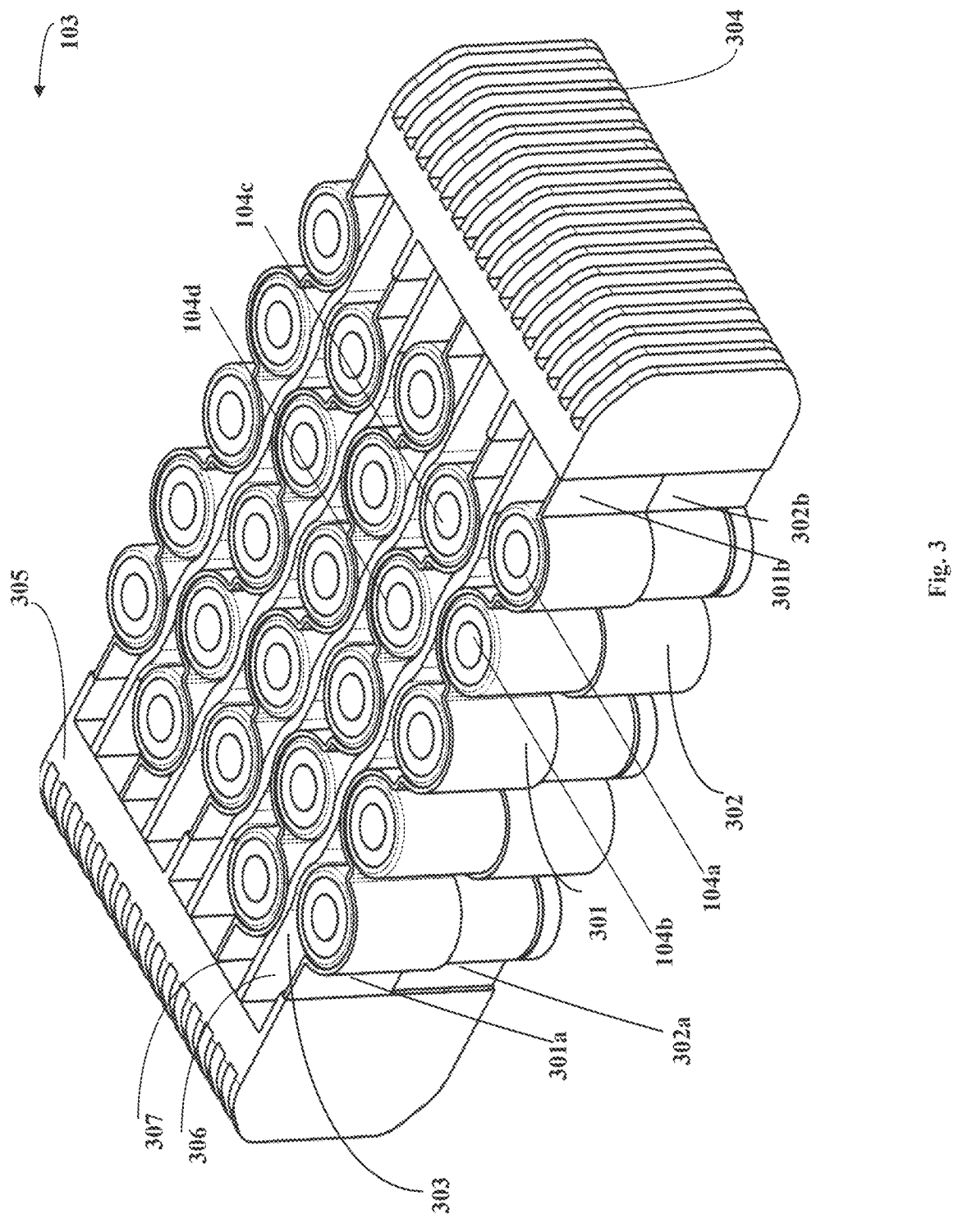
FIG. 3 exemplarily illustrates a perspective view of a thermal barrier assembly illustrated in FIG. 2.

FIG. 3 exemplarily illustrates a perspective view of the thermal barrier assembly 103 illustrated in FIG. 2. The thermal barrier assembly 103 comprises at least one partition structure, 301, 302 in thermal contact along a length of at least one row comprising at least one cell, such as, 104a for extracting heat from that cell 104a. The thermal barrier assembly 103 further comprises at one heat dissipating structure 304, 305 positioned proximal to at least one end 301a, 301b or 302a, 302b of the partition structure 301 and 302 and thermally coupled to the partition structure 301 and 302 to dissipate the extracted heat away from the cells 104. As used herein, "thermal contact" refers to a contact between two structures or surfaces that enables transfer of heat between the structures. The transfer of heat may be by conduction, convection, radiation, or any other known modes. For the transfer of heat to take place, the structures may or may not be in physical contact. As exemplarily illustrated, the cells 104 are positioned in rows, such as, 306, 307 and the thermal barrier assembly 103 includes a plurality of cells in the plurality of rows 306, 307. There are multiple cells, for example, 5 cells, such as, 104a, in each row. The thermal barrier assembly 103 comprises at least one partition structure, that is, a first partition structure 301 and a second partition 302 structure that extends along the length of the row of cells 104. Each row of cells has a corresponding first partition structure 301 and a corresponding second partition structure 302. Also, at both the ends of the partition structures 301, 302, there are two heat dissipating structures 304 and 305. The first partition structure 301 and the second partition structure 302 are in thermal contact with the cells 104a, 104b along the periphery of the cells 104a, 104b and extract heat from each of the cells 104a, 104b in a row 306. Here, the first partition structure 301 and the second partition structure 302 are in physical contact with the cells 104a, 104b to extract heat. The partition structures 301, 302 are thermally conductive sheets with a series of alternating crests and troughs formed on their surface. The cells 104a, 104b are in contact with the surface of the partition structures 301, 302 in the crests and the troughs. The first partition structure 301 and the second partition structure 302 are both serpentine in profile with a contour conforming to an external surface of the cylindrical cells 104a, 104b. The heat dissipating structures 304, 305 at the ends of the first partition structure 301 and the second partition structure 302 are thermally coupled to the first partition structure 301 and the second partition structure 302. The heat extracted from each of the cells 104a, 104b is transferred to the heat dissipating structures 304, 305 through the first partition structure 301 and the second partition structure 302 and the heat dissipating structures 304, 305 transfer the heat to surrounding air within the casing 101 by means of convection. The heat is thus channelized away from the cells 104a, 104b to limit conduction of heat between the cells in different rows 306, 307, thereby eliminating thermal runaway of the battery module 100.

The thermal barrier assembly 103 further comprises at least one thermal shield 303 in contact with at least one partition structure 301, 302 and extending along the length of at least one row 306 for thermally insulating at least one cell 104a in the row 306 from the plurality of cells 104c, 104d in a plurality of adjacent rows such as, 307. That is, the thermal barrier assembly 103 comprises a thermal shield 303 that runs along the length of each row 306, 307 of the cells 104. The thermal shield 303 is in contact with the first partition structure 301 and/or second partition structure 302 for thermally insulating each row 306 of cells 104a, 104b from other rows 307 of cells 104c, 104d in the placeholders 106a. The thermal shield 303 curtails the propagation of fire in the lateral direction of the cells 104 in the cell holders 105,106. In an embodiment, the partition structures 301, 302 and the thermal shield 303 may be inserted in slits in the cell holders 105, 106 next to the placeholders 106a for the cells 104 and may be supported vertically by the cell holders 105, 106. Similarly, the heat dissipating structures 304, 305 may be supported by the cell holders 105, 106 at the top and the bottom to stay intact and be vibration proof within the casing 101 of the battery module 100.

Consider there are multiple cells in each of the rows of the placeholders 106a in the cell holders 105, 106. Also, consider the cells in a first row as a first plurality of cells or first set of cells 104a, 104b and the cells in a second row as a second plurality of cells or second set of cells 104c, 104d in FIG. 3. The first set of cells 104a, 104b are in thermal contact with respective first partition structure 301 and the second partition structure 302. Similarly, the second set of cells 104c, 104d are in thermal contact with respective first partition structure (not shown) and respective second partition structure (not shown). The thermal shield 303 is positioned between the first partition structure 301 and the second partition 302 of the first set of cells 104a, 104b and the first partition structure (not shown) and the second partition structure (not shown) of the second set of cells 104c, 104d in the adjacent row. The thermal shield 303 prevents propagation of fire from the first set of cells 104a, 104b to the second set of cells 104c, 104d. The thermal shield 303 is an insulation layer wrapped over the first set of cells 104a, 104b, the second set of cells 104c, 104d, and the partition structures 301, 302. The thermal shield 303 adds extra resistance to heat to pass through the partition structures 301, 302 and thus heat is passed only along the length of the partition structures 301, 302 towards the heat dissipating structures 304, 305.

Figures 4A, 4B:
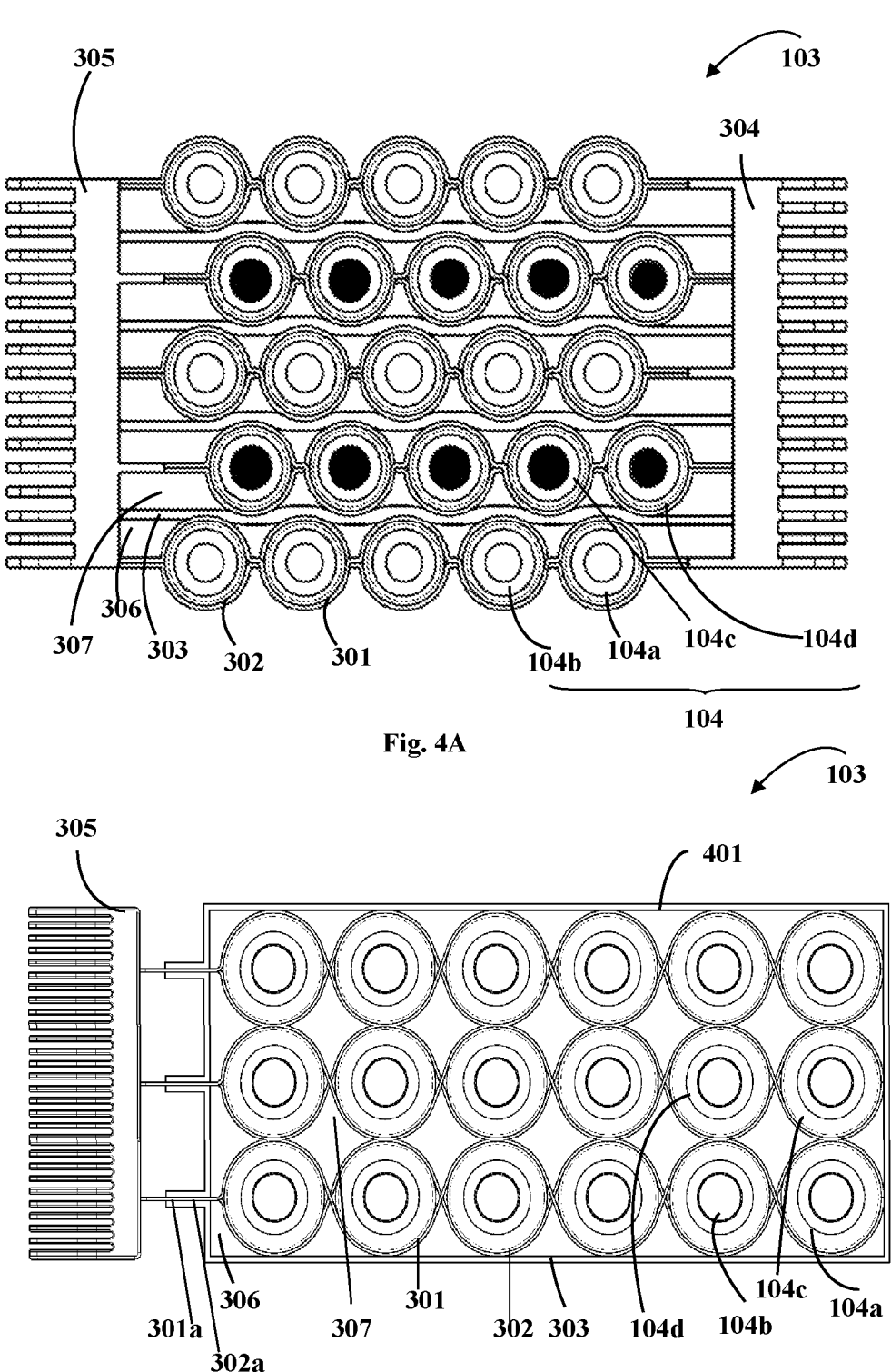
FIGS. 4A-4B exemplarily illustrate a plan view of the thermal barrier assembly illustrated in FIG. 3, encompassing cells.

FIGS. 4A-4B exemplarily illustrate a plan view of the thermal barrier assembly 103 illustrated in FIG. 3, encompassing the cells 104. As viewed in FIG. 4A, there are multiple cells 104a, 104b, in row 306 and similarly multiple cells 104c, 104d in row 307 respectively and the alternating rows 306 and 307 of cells 104a, 104b and 104c, 104d are connected in series or parallel with each other. At both ends 301a, 301b, 302a, 302b of the partition structures 301, 302, the heat dissipating structures 304, 305 are removably attached to the partition structures 301, 302, as indicated in FIG. 3. The first set of cells 104*a*, 104*b* in the first row 306 are connected to each other in series or parallel and the second set of cells 104*c*, 104*d* in the second row (adjacent row) 307 are connected to each other in parallel or series, respectively. Between the partition structures 301, 302, of the first set of cells 104*a*, 104*b* and the adjacent partition structures (not shown) of the second set of cells 104*c*, 104*d*, the thermal shield 303 is disposed. The thermal shield 303 extends the entire length of the row 306, 307. The thermal shield 303 physically and thermally separates the first set of cells 104*a*, 104*b* from the second set of cells 104*c*, 104*d*. Similarly, such thermal shields 303 are positioned between all the rows of cells 104 in the thermal barrier assembly 103. Also, in case of overcharging, the cells that are connected in parallel are prone to thermal runaway than the cells connected in series. Consider, the first set of cells 104*a*, 104*b* are connected in series and the second set of cells 104*c*, 104*d* are connected in parallel. In case of thermal runaway, the second set of cells 104*c*, 104*d* are damaged and may cause fire. However, the thermal shield 303 between the first set of cells 104*a*, 104*b* and the second set of cells 104*c*, 104*d* prevents the spread of fire to the first set of cells. Similarly, a next thermal shield (not labeled) between the second set of cells 104*c*, 104*d* and the next adjacent rows of cells (not labeled) connected in series isolates the spread of fire laterally across the third rows of cells in the battery module. The second set of cells 104*c*, 104*d* with parallel connection are compromised, while the adjacent rows of cells are protected. The thermal shield 303 is also removably attached to the heat dissipating structures 304, 305 at its ends.

As can be seen in FIG. 4B which indicates an alternate embodiment, there are multiple cells in each row and the cells 104*a*, 104*b* or 104*c*, 104*d* in each row 306 or 307 are connected in only series or only parallel connection with each other. At one of the ends 301*a*, 302*a* of the partition structures 301, 302, a heat dissipating structure 305 is removably attached to the partition structures 301, 302. As per this alternate embodiment, the first set of cells 104*a*, 104*b* in the first row 305 are connected to each other in series and the second set of cells 104*c*, 104*d* in the second row (adjacent row) 307 are also connected to each other in series. The first partition structure 301 and the second partition structure 302 surround each cell 104*a*, 104*b* and remain in thermal contact with each cell 104*a*, 104*b*. In this embodiment of assembly of cells that are connected in series, a thermal shield 303 is absent between the rows 306, 307 of cells 104*a*, 104*b*, 104*c*, 104*d*. The similarly connected cells are separated by only the partition structures 301, 302 and form a cell pack 401. The cell pack 401 may be surrounded by a thermal shield 303 that is in thermal contact with the partition structures 301, 302 of the cells in the first row 306 and the last row forming the cell pack 401. An adjacent cell pack or a row of cells in the battery module adjacent to the cell pack 401 may have cells differently connected, such as, in parallel. To curtail spread of the fire from the parallelly connected cell pack to a series connected cell pack (not shown) in the battery module 100, the thermal shield 303 is positioned between the adjacent cell packs. The thermal shield 303 is also removably attached to the heat dissipating structure 305 at three locations. In an embodiment, single heat dissipating structure 305 may connect to multiple cell packs in the battery module 100. This embodiment prevents the risk of spread of thermal runaway or fire from one cell pack to an adjacent cell pack thereby restricting the potential damage to the battery module 100 and providing safety to the user of the battery module 100.

Figures 5A, 5B:
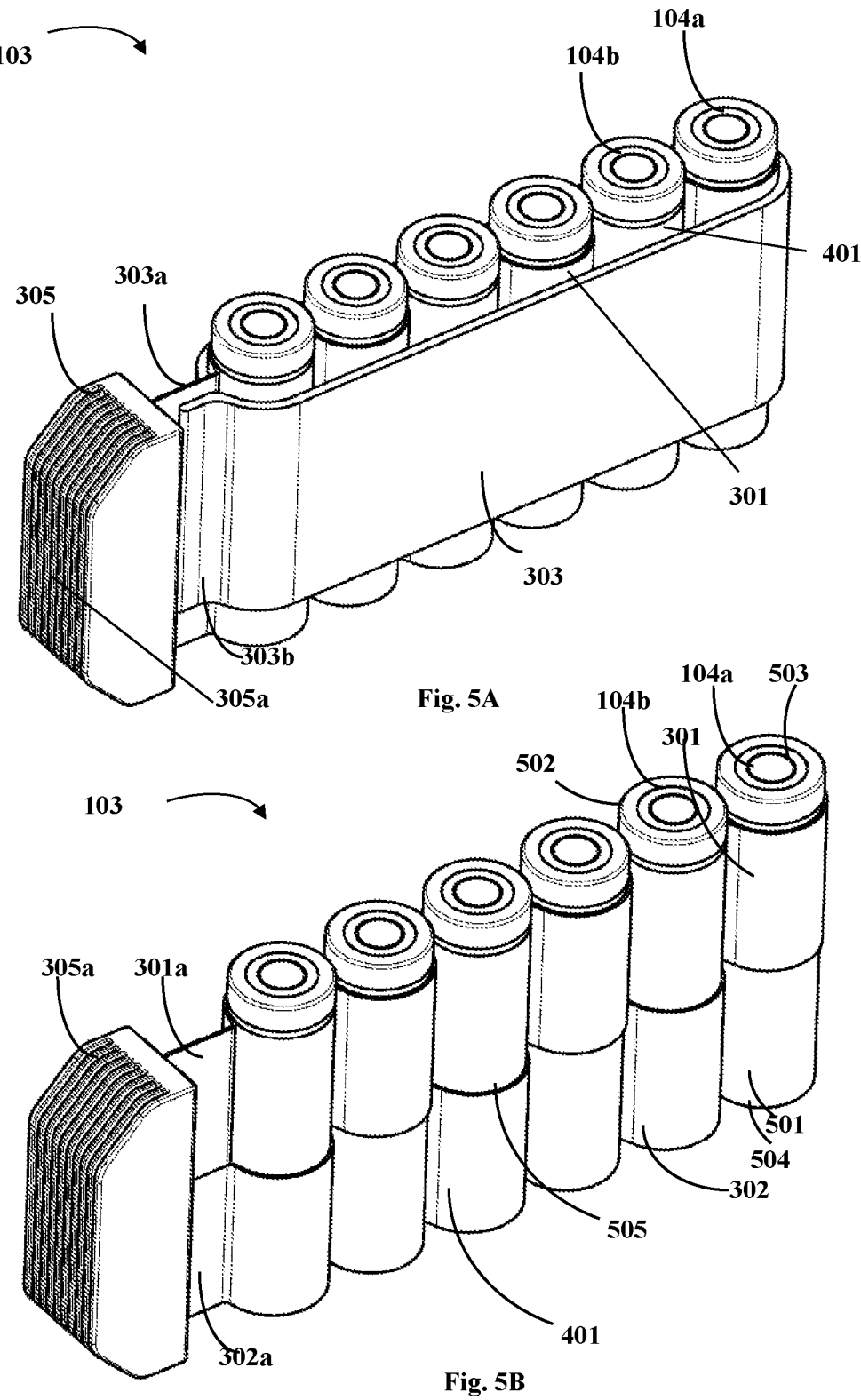
FIGS. 5A-5B exemplarily illustrate a perspective view of a thermal barrier assembly encompassing a first plurality of cells.

FIGS. 5A-5B exemplarily illustrate a perspective view of a thermal barrier assembly 103 encompassing a first set of cells 104*a*, 104*b*. As exemplarily illustrated in FIG. 5A, the thermal shield 303 surrounds on the first set of cells 104*a*, 104*b* and forms a cell pack 401. The thermal shield 303 isolates the first set of cells 104*a*, 104*b* from the rest of the cells in the battery module 100. The thermal shield 303 is removably attached to the heat dissipating structure 305 on a rear surface of the heat dissipating structure 305. The heat dissipating structure 305 is a heat sink that dissipates and transfers the heat generated by the cells to the surrounding air that is cooler. Thereby, the heat dissipating structure 305 regulates the temperature of the cells. In order to maximise the surface area of contact with the surrounding air, the heat dissipating structure 305 comprises airflow guides 305*a*. The airflow guides 305*a* are fin-like structures that extends from a base of the heat dissipating structure 305 to form the front surface of the heat dissipating structure 305. The airflow guides 305 may extend along the entire length of the base or may cover the base partially. On a rear surface of the heat dissipating structure 305, there are extension members that engage with the thermal shield 303 and the partition structures 301, 302 as will be seen in FIG. 7.

FIG. 5B shows a perspective view of the thermal barrier assembly 103 comprising the partition structures 301, 302 in thermal contact with each of the first set of cells 104*a*, 104*b*, with the thermal shield 303 removed. The partition structures 301, 302 are shown in different colors for the purpose of clarity. As exemplarily illustrated, the ends of the partition structures 301, 302 are connected to the heat dissipating structure 305 at one end on its surface. The first partition structure 301 extends from a top end 503 of each of the cells 104*a* till a contact level 505 along the length of the cell 104*a*. The rest of the length of the cell 505 from the contact level to the bottom end 504 is in contact with the second partition structure 302. The first partition structure 301 and the second partition structure 302 have a serpentine profile that conforms with the first surface 501 and the second surface 502 of each of the cells 104*a*. The first surface 501 and the second surface 502 of the cells 104*a*, 104*b* are diametrically opposite to each other and the first surface 501 and the second surface 502 together define the periphery of each of the cells 104*a*, 104*b*. The first surface 501 of a cell 104*a* is in thermal contact with the first partition structure 301 from its top end till a predetermined-level 505 or in thermal contact with the second partition structure 302 from its bottom end till the predetermined-level 505.

Correspondingly, the second surface 502 of the same cell 104*b* is in thermal contact with the second partition structure 302 from its bottom end 504 till a predetermined-level 505 or in thermal contact with the first partition structure 301 from its top end 503 till the predetermined-level 505. Thus, a cell 104*a* is in thermal contact with the first partition structure 301 on one vertical wall portion of its surface 501 and in thermal contact with the second partition structure 302 on the diametrically opposite balance vertical wall portion of its surface 502. The ends 301*a*, 302*a* of the serpentine partition structures 301, 302 engages with a surface of one or more heat dissipating structures 305. As per an embodiment, the contact level 505 corresponds to a substantially mid-level of the height of the cell 104*a*. As per another embodiment, the vertical portion of the surface of cell 104*a* in thermal contact with the partition structures 301, 302 is substantially a one-half surface 501, 502 and a second-half vertical surface 501, 502 of the cell 104*a*.

Figure 6A:
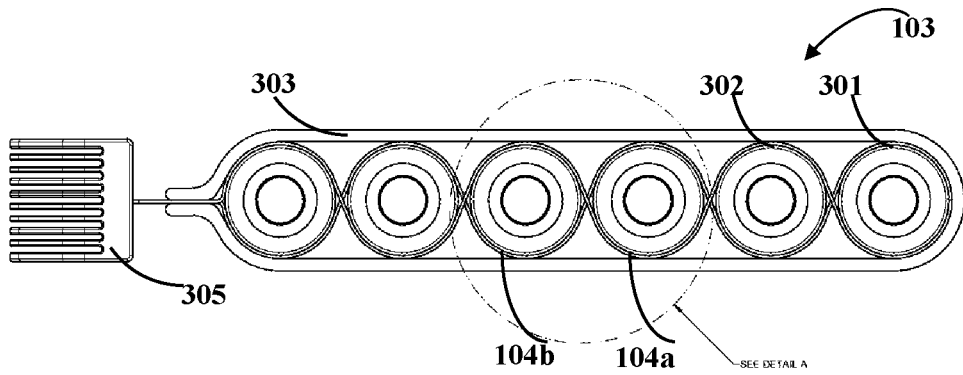
FIGS. 6A-6B exemplarily illustrates a plan view of the thermal barrier assembly illustrated in FIG. 5A and an enlarged view of a detail of the plan view, respectively.
Figure 6B:
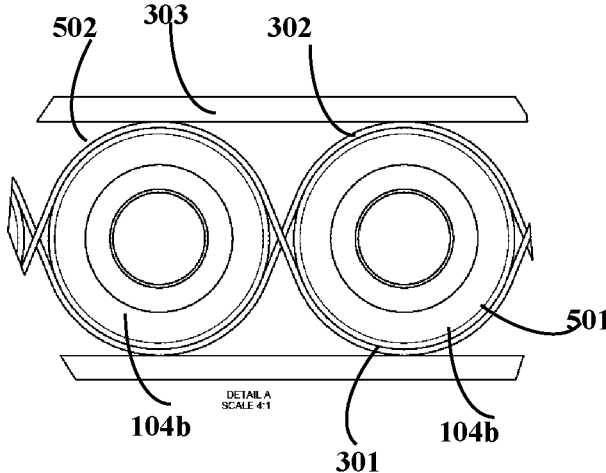

FIGS. 6A-6B exemplarily illustrates a plan view of the thermal barrier assembly 103 illustrated in FIG. 5A and an enlarged view of a detail of the plan view, respectively. As seen FIG. 6A, the thermal shield 303 surrounding the first set of cells 104a, 104b ends in thermal contact with the heat dissipating structure 305 on its end surface. The first partition structure 301 and second partition structure 302 are in thermal contact with the first surface 501 and the second surface 502 of the first set of cells. An enlarged view of a detail of adjacent cells in the first set of cells 104a, 104b is shown in FIG. 6B. Consider first cell 104a of the adjacent cells to have the first partition structure wrapped around it on a first surface 501. The same first partition structure 301 that extends along the length of the row with the first set of cells 104a, 104b is wrapped on a second surface 502 of the adjacent cell 104b. Similarly, the second partition structure 302 is wrapped on the second surface 501 of the first cell 104a and wrapped on the first surface 501 of the adjacent cell 104b. Thus, between two adjacent cells 104a, 104b, the first partition structure 301 may resemble an 'horizontally oriented inverted-S shape' in the plan view and the second partition structure 302 may resemble an 'horizontally oriented S-shape' in the plan view. The direction of wrapping the first partition structure 301 and the second partition structure 302 are opposite to each other. Also, can be seen is that the first partition structure 301 and the second partition structure 302 prevent direct contact between the cells 104a, 104b. The first partition structure 301 and the second partition structure 302 get heated with the heat from the cells 104a, 104b. To avoid communicating this heat to adjacent rows of cells, the thermal shield 303 acts as an insulation layer. On portions of the first surface 501 or the second surface 502 of the cells 104a, 104b, where the partition structure 301, 302 is absent, the thermal shield 303 is in direct thermal contact with the cells 104a, 104b preventing transfer of heat to other cells in other rows.

Figure 7:
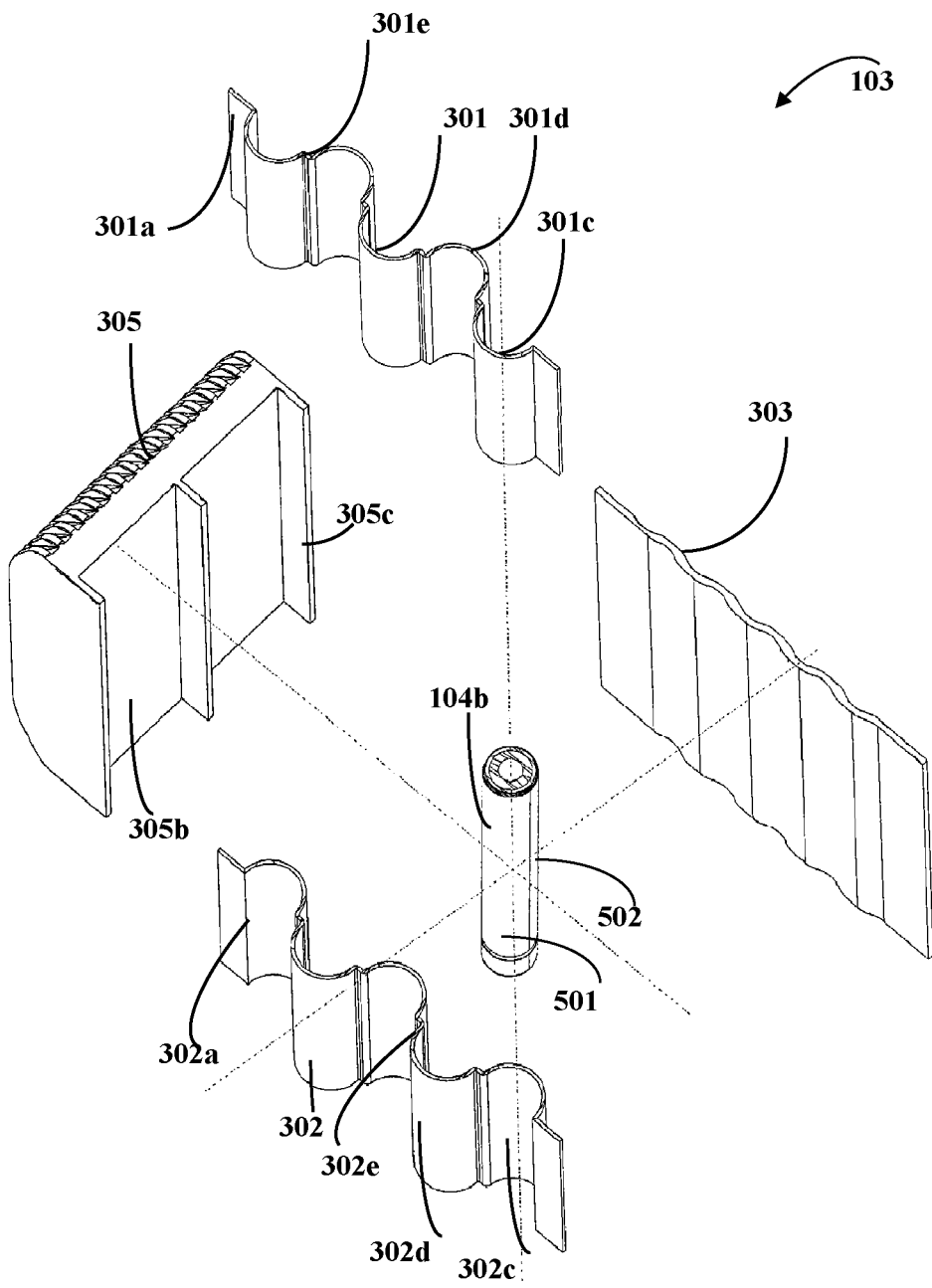
FIG. 7 exemplarily illustrates an exploded view of the thermal barrier assembly encapsulating at least one cell positioned in at least one row.

FIG. 7 exemplarily illustrates an exploded view of the thermal barrier assembly 103 encapsulating at least one cell 104b positioned in at least one row 305. Assume the cell 104b is positioned in a row 305 of the placeholders 106a of a cell holder 106 as described in FIG. 2. Once positioned, the first partition structure 301 is positioned in thermal contact with the first surface 501 of the cell 104b. The second partition structure 302 is positioned vertically below the first partition surface 301 and in thermal contact with the second surface 502 of the same cell 104b. On one side of the cell 104b, the first partition structure 301 covers a section of the external surface 501 and on the other side, the second partition structure 302 covers another section of the external surface 502. After the first partition structure 301 and the second partition structure 302 are in thermal contact with the cell 104b, the thermal shield 303 is positioned in thermal contact with the partition structures 301, 302 and the cell 104b. The thermal shield 303 also has a substantially serpentine profile to conform with the external surface 501, 502 of the cell 104b and the contour of the partition structures 301, 302. The heat dissipating structure 305 comprises evenly distributed flat extension members 305c extending from the base 305b to engage with the ends 301a, 302a of the partition structures 301, 302 and the thermal shield 303.

The serpentine profiled partition structures 301, 302 comprise a series of alternating crests 301c, 302c and troughs 301d, 302d, as seen. The surface of the crests 301c, 302c and troughs 301d, 302d is in thermal contact with the cells. The contour of the crests 301c, 302c and the troughs 301d, 302d conforms with the external surface 501, 502 of the cell 104b. Since, the cells, such as, 104b are cylindrical, the troughs 301d, 302d and the crests 301c, 302c have semi-circular cross section. As per an embodiment, to ensure good surface contact and assembly of the cells, such as, 104b into the crests 301c, 302c and the troughs 301d, 302d that conform to the surfaces 501, 502 of the cells 104b, a flat section 301e, 302e is provided between a crest 301c, 302c and a trough 301d, 302d, to mark start of the crest 301c, 302c and the trough 301d, 302d. To remain in thermal contact with the cells 104b, the surface of the partition structures 301, 302 in the crests 301c, 302c and the troughs 301d, 302d has an adhesive layer or any attachment means, such as, screw and nut assembly, Velcro strips, etc., disposed on them. Such attachment means withstand elevated temperature of the cells 104b. The partition structures 301, 302 are made of a composite, for example, a graphite composite with a thermal conductivity in a range from about 700 W/mK to about 100 W/mK along its length. The partition structures 301, 302 can sustain elevated temperatures of about 400 degree Celsius. In an embodiment, the serpentine partition structures 301, 302 may be made into elastic structures that conform to the external surface 501, 502 of the cells 104b, without needing any attachment means to ensure thermal contact between the cells 104b and the partition structures 301, 302.

The thermal shield 303 is a sheet made of an inorganic compound, such as, aluminium magnesium silicate that has a high melting point of about 1300° C. to about 1900° C. The thermal shield 303 effectively functions up to about 1200° C. to resist fire and due to the absence of any organic material, the thermal shield 303 is non-flammable. The thickness of the thermal shield 303 can increase if more number of cells is present in the battery module 100. As per an embodiment, the thickness of the thermal shield 303 is about 3 mm to prevent fire propagation to about 3 rows of cells with minor damages to the cells, while their output voltages remain undisturbed.

The heat dissipating structures 304, 305 at the ends of the partitions structures 301, 302 and the thermal shield 303 are made of light weight materials, such as, Aluminium and are exposed to ambient air for passive cooling of the cells 104b. In an embodiment, the airflow guides 305a of the heat dissipating structures 304, 305 may be in contact with forced air or liquid over for active cooling of the cells 104b and also to enhance the cooling of the cells 104b. The thermal contact between partition structures 301, 302 and the heat dissipating structures 305, 306 is established using adhesives, screws, Velcro strips, etc., between the ends 301, 302a, 301b, 302b of the partition structures 301, 302 and the extension members 305c of the heat dissipating structures 304, 305. The thermal contact may be enhanced by the use of a thermal conductive paste or gel. With the use of the partition structures 301, 302 and the heat dissipating structures 304, 305, cell temperatures, as per an embodiment, are reduced by 10° C. and the time to cool the cells is less than 30 minutes. In an embodiment, partitions structures 301, 302, with silicon or acrylic type thermal pads in the crests 301c, 302c and the troughs 301d, 302d may be used for enhanced thermal contact with the cells 104b.

The thermal shield 303 is a thermal insulating layer and prevents spread of heat and fire towards it and beyond it. In an embodiment, the material of the thermal shield 303 may be thermal conducting on one side and thermal insulating on the other side. In another embodiment, the thermal shield may be thermal conducting in one direction, that is, along its length and thermal insulating towards the thickness of the thermal shield 303. In both these embodiment, the thermal shield 303 may conduct heat from a first set of cells 104a, 104b in a first row 306 and may not transfer the heat to the second set of cells 104c, 104d in the adjacent row 307.

Figure 8:
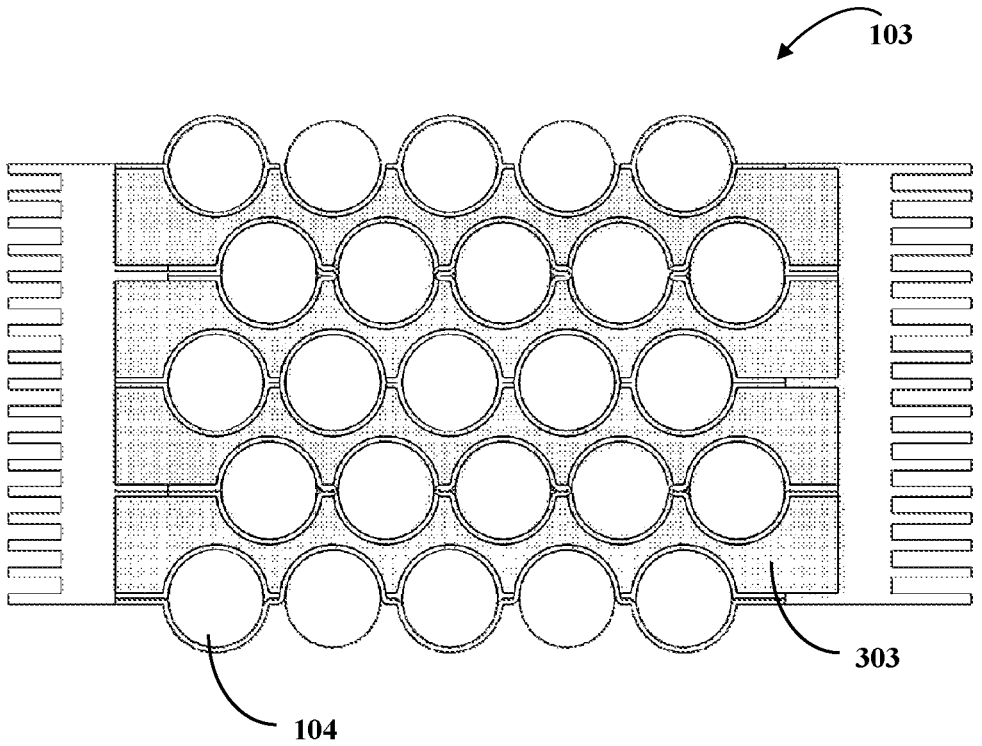
FIG. 8 exemplarily illustrates a plan view of a thermal barrier assembly with an insulation foam as a thermal shield.

FIG. 8 exemplarily illustrates plan view of a thermal barrier assembly 103 with an insulation foam as a thermal shield 303. In this embodiment, the thermal shield 303 as a sheet is replaced by the insulation foam. The insulation foam 303 has good flame retarding ability and is light weight (<0.2 g/cm³) with very low thermal conduction (0.1 W/mK). The insulation foam 303 may expand on being exposed to elevated temperatures and may isolate the other cells from heat and fire. Such an insulation foam 303 also facilitates tight packaging of the cells 104 and maintains the cells 104 intact even in case of catastrophe, by providing cushioning to the cells 104 in the casing 101.

The battery module with the thermal barrier assembly disclosed in the present invention provides the following technical advancement in the field of thermal management of energy storage devices: The battery modules disclosed here are rechargeable modules, such as, Lithium ion batteries with Lithium ion cells. During normal operation of the battery module, the temperature of cells rises. During charging, overcharging, extended operation, the temperatures may drastically rise. In both these conditions, the thermal barrier assembly its associated components, such as the partitions structures, the thermal shield, and the heat dissipating structures extract and dissipate the heat away from the cells.

The thermal barrier assembly reduces the temperature of the cells and subsequently cools the battery module passively, without using active cooling systems. The serpentine profile of the partition structures enables good and long thermal contact between the cells and the partition structure. Also, the flat sections between the crests and the troughs in the partition structures mark start of the surface for positioning the cells in contact with the partition structure. Thus, the flat section aids in simple assembly of the components of the thermal barrier assembly and the cells in the cell holders. In case of overcharging or abuse to the battery module, where a fire has ensued in the battery module, the thermal shield is capable of arresting propagation of fire further to other cells in the battery module. The insulating nature of the thermal shield ensures the partition structures extract the heat and transmit it towards the heat dissipating, instead of spreading to other cells in other rows. Thus, the thermal shield channelizes the flow of heat towards the heat dissipating structure and away from the cells.

Also, the design of the heat dissipating structure, the airflow guides aid in faster cooling of the partition structures and the thermal shield and in turn the cells. The attachment means to establish thermal contact between the partition structures, the thermal shield and the heat dissipating structures also facilitate simple, non-cumbersome assembly, maintenance, and servicing of the battery module. The components of the thermal barrier assembly are supported by the cell holders of the battery module. Hence, the thermal barrier assembly being modular may be installed in existing battery modules with similar cell holder construction. The thermal barrier assembly can also function along with existing cooling mechanism of a battery module.

The components of the thermal barrier assembly are light weight, have features that guide in mounting while assembly, maintenance, and servicing, are thin not occupying more space, making the battery module compact, as well as safe to use preventing thermal runaway and elevated operating temperatures. The battery module with such a thermal barrier assembly finds application in space constrained mobile devices, products, vehicle, such, two-wheelers, three-wheelers, or any multi-wheeled vehicle, such passenger trucks that experience lot of shock and vibrations. The components of the thermal barrier assembly are tightly lodged into the cell holders and tightly adhered to the cells and do not get dislodged due to vibration and shocks. The battery module with the thermal barrier assembly can be charged immediately after a discharge, as the temperature is maintained and reduced to optimal levels faster than usual batteries. Such a battery module may be used to drive electric and hybrid electric vehicles for longer distances, without much delay in the trip due to the charging cycle.

Improvements and modifications may be incorporated herein without deviating from the scope of the invention.

LIST OF REFERENCE NUMERALS

100—Battery module
101—casing
102—first end cover
103—thermal barrier assembly
104—cells
104*a*, 104*b*—first plurality cells
104*c*, 104*d*, second plurality of cells,
105, 106—cell holders
107—second end cover
108, 109—protective sheets
301—first partition structure
302—second partition structure
301*a*, 302*a*, 301*b*, 302*b*—ends of the partition structures
301*c*, 302*c*—crests in partition structures
301*d*, 302*d*—troughs in partition structures
301*e*, 302*e*—flat section between crests and troughs in the partition structures
303—thermal shield
303*a*, 303*b*—ends of thermal shield
304, 305—heat dissipating structures
304*a*—airflow guides
304*b*—base
304*c*—extension members
306—first row
307—second row
401—cell pack
501—first surface
502—second surface
503—top end
504—bottom end
505—contact level

We claim:

1. A battery module comprising:

a plurality of cells positioned in a plurality of rows enclosed within a casing, wherein each of the plurality of cells comprises at least a first plurality of cells and a second plurality of cells; and a thermal barrier assembly encapsulating the plurality of cells in the plurality of rows for thermal management of the plurality of cells, wherein the thermal barrier assembly comprises:

at least one partition structure in thermal contact along a length of at least one row of the plurality of rows for extracting heat from the first plurality of cells, and at least one heat dissipating structure positioned proximal to at least one end of the at least one partition structure and thermally coupled to the at least one partition structure for dissipating extracted heat away from the plurality of cells in the plurality of rows, wherein the at least one partition structure comprises:

a first partition structure that is positioned in thermal contact with a first surface and a second surface of the first plurality of cells and is proximal to a top end of the first plurality of cells in the at least one row of the plurality of rows, and a second partition structure that is positioned in thermal contact with the second surface and the first surface and is proximal to a bottom end of the second plurality of cells in the at least one row of the plurality of rows, wherein the first surface and the second surface of the first plurality of cells are diametrically opposite and define an external periphery of the first plurality of cells, wherein the first partition structure extends, along a length, from a top end of the first plurality of cells till a contact level of the first surface and the second surface, and the second partition structure extends, along the length, from a bottom end of the first plurality of cells till the contact level of the first surface and the second surface, for extracting heat from the first surface and the second surface from each of the first plurality of cells, and wherein the contact level corresponds to a mid-level height of the first plurality of cells.

2. The battery module of claim 1, wherein adjacent cells in the first plurality of cells are separated by the first partition structure and the second partition structure for preventing thermal contact between the adjacent cells of the first plurality of cells.

3. The battery module of claim 2, wherein each of the first partition structure and the second partition structure has a serpentine profile with a contour conforming with the first surface and the second surface of the adjacent cells of the first plurality of cells.

4. The battery module of claim 2, wherein each of the first partition structure and the second partition structure comprises a series of alternating crests and troughs to establish thermal contact with the first surface and the second surface of the adjacent cells of the first plurality of cells.

5. The battery module of claim 4, wherein each of the first partition structure and the second partition structure comprises a flat section between each pair of the crest and the trough for surface contact of the plurality of cells with each of the first partition structure and the second partition structure.

6. The battery module of claim 4, wherein the each of the first partition structure and the second partition structure comprises one of silicon and acrylic type thermal pads in the crests and the troughs for enhanced thermal contact with the plurality of cells.

7. The battery module of claim 1, wherein a one-half of the first surface is in thermal contact with one of the first partition structure and the second partition structure and a second-half of the second surface is in thermal contact with one of the second partition structure and the first partition structure, respectively.

8. The battery module of claim 1, wherein the first partition structure and the second partition structure are made of a composite material with a thermal conductivity in a range from about 700 W/mK to about 100 W/mK along a length of the first partition structure and the second partition structure.

9. The battery module of claim 1, wherein the thermal barrier assembly comprises at least one thermal shield with a serpentine profile, the thermal barrier is in contact with at least one of the first partition structure and the second partition structure, and the thermal shield extends along a length of the at least one row of the plurality of rows for thermally insulating the at least one cell of the first plurality of cells in the at least one row of the plurality of rows.

10. The battery module of claim 9, wherein the first plurality of cells are electrically connected in series and positioned in the one of the plurality of rows and the second plurality of cells are electrically connected in parallel and positioned in an adjacent row of the plurality of rows.

11. The battery module of claim 10, wherein at least one thermal shield is positioned between the first plurality of cells and the second plurality of cells and is in contact with the at least one of the first partition structure and the second partition structure of each of the first plurality of cells and the second plurality of cells, and the thermal shield of the each of the first plurality of cells and the second plurality of cells arresting propagation of heat and fire from the first plurality of cells towards the second plurality of cells.

12. The battery module of claim 9, wherein the at least one thermal shield extends till at least one heat dissipating structure, the at least one heat dissipating structure is positioned proximal to the at least one end of the at least one row of the plurality of cells, and the at least one thermal shield is coupled to the at least one heat dissipating structure.

13. The battery module of claim 9, wherein the at least one thermal shield separates a series connected cell pack from one of adjacent cells of the connected cell pack.

14. The battery module of claim 9, wherein the at least one thermal shield is thermally conducting on one side and thermally insulating on an opposite side.

15. The battery module of claim 9, wherein the at least one thermal shield is thermally conducting in along a length of the at least one thermal shield and thermally insulating towards a thickness of the at least one thermal shield.

16. The battery module of claim 9, wherein the at least one thermal shield is one of a sheet of an inorganic compound, an insulation foam, and a polymer membrane.

17. The battery module of claim 9, wherein the at least one thermal shield is a sheet made of aluminum magnesium silicate with a high melting point of about 1300° C. to about 1900° C.

18. The battery module of claim 9, wherein a thickness of the at least one thermal shield is about 3 mm to prevent fire propagation to about 3 rows of cells of the plurality of cells while output voltages of the plurality of cells remain undisturbed.

19. The battery module of claim 1, wherein the at least one heat dissipating structure comprises at least one airflow guide and a planar rear surface, the at least one airflow guide is disposed on an external surface of the battery module and is in contact with air within the casing, and the planar rear surface is thermally coupled to the at least one partition structure and at least one thermal shield.

20. The battery module of claim 19, wherein the at least one heat dissipating structure further comprises at least one extension member extending from the planar rear surface for removably engaging with ends of the at least one partition structure and the at least one thermal shield.

21. The battery module of claim 1, further comprises at least one cell holder for holding and structurally supporting the plurality of cells in position.

22. A thermal barrier assembly for a battery module, the thermal barrier assembly comprising:

a first partition structure with a serpentine profile conforming and in thermal contact with a first surface and a second surface of a first plurality of cells of the battery module for extracting heat from the first surface and the second surface of the first plurality of cells, a second partition structure with a serpentine profile conforming and in thermal contact with the second surface and the first surface of the first plurality of cells for extracting heat from the second surface and the first surface of the first plurality of cells, a thermal shield with a serpentine profile in contact with each of the first partition structure and the second partition structure of the first plurality of cells, wherein the first partition structure and the second partition structure of a second plurality of cells of the battery module thermally insulating the first plurality of cells from the second plurality of cells, at least one heat dissipating structure in thermal contact with the first partition structure, the second partition structure, and the thermal shield, dissipating the extracted heat away from the first plurality of cells and the second plurality of cells, wherein the first surface and the second surface of the first plurality of cells are diametrically opposite and define an external periphery of the first plurality of cells, wherein the first partition structure extends, along a length, from a top end of each of the first plurality of cells till a contact level of the first surface and the second surface of each of the first plurality of cells, and the second partition structure extends, along the length, from a bottom end of each of the first plurality of cells till the contact level of the first surface and the second surface of each of the first plurality of cells and each of the second plurality of cells, for extracting heat from the first surface and the second surface from the each of the first plurality of cells, and wherein the contact level corresponds to a mid-level height of the each of the first plurality of cells and the second plurality of cells.

23. The thermal barrier assembly of claim 22, wherein a one-half of the first surface is in thermal contact with one of the first partition structure and the second partition structure, and a second-half of the second surface is in thermal contact with one of the second partition structure and the first partition structure, respectively.

24. The thermal barrier assembly of claim 22, wherein the first plurality of cells and the second plurality of cells are positioned in at least two rows of a plurality of rows within a casing of the battery module.

25. The thermal barrier assembly of claim 24, wherein adjacent cells in the first plurality of cells are positioned in one of the two rows of the plurality of rows, the two rows of the plurality of rows are separated by the first partition structure and the second partition structure for preventing thermal contact between the adjacent cells of the first plurality of cells.

26. The thermal barrier assembly of claim 25, wherein each of the first partition structure and the second partition structure comprises a series of alternating crests and troughs, and a flat section disposed between each pair of the crest and the trough to establish thermal contact with the first surface and the second surface of the adjacent cells of the first plurality of cells.

27. The thermal barrier assembly of claim 26, wherein each of the first partition structure and the second partition structure comprises one of silicon and acrylic type thermal pads in the crests and the troughs for enhanced thermal contact with the second plurality of cells.

28. The thermal barrier assembly of claim 24, wherein the first plurality of cells are electrically connected in series and positioned in one of the two rows of the plurality of rows, and the second plurality of cells are electrically connected in parallel and positioned in an adjacent row to the one of the two rows of the plurality of rows.

29. The thermal barrier assembly of claim 22, wherein the first partition structure and the second partition structure are made of a composite with a thermal conductivity in a range from about 700 W/mK to about 100 W/mK along a length of the first partition structure and the second partition structure.

30. The thermal barrier assembly of claim 22, wherein the thermal shield separates a series connected cell pack from one of adjacent cells of the connected cell pack.

31. The thermal barrier assembly of claim 22, wherein the thermal shield is thermally conducting on one side and thermally insulating on an opposite side.

32. The thermal barrier assembly of claim 22, wherein the thermal shield is thermally conducting along a length of the thermal shield and thermally insulating towards a thickness of the thermal shield.

33. The thermal barrier assembly of claim 22, wherein the thermal shield is one of a sheet of an inorganic compound, an insulation foam, and a polymer membrane.

34. The thermal barrier assembly of claim 22, wherein the thermal shield is a sheet made of aluminium magnesium silicate with a high melting point of about 1300° C. to about 1900° C.

35. The thermal barrier assembly of claim 22, wherein a thickness of the thermal shield is about 3 mm to prevent fire propagation to about 3 rows of of a plurality of rows with minor damages to the plurality of cells in the battery module, while output voltages of the plurality of cells remain undisturbed.

36. The thermal barrier assembly of claim 22, wherein the at least one heat dissipating structure comprises at least one airflow guide and a planar rear surface, the at least one heat dissipating structure is disposed on an external surface of the battery module and is in contact with air within a casing, and the planar rear surface is thermally coupled to the first partition structure and the second partition structure and the thermal shield.

37. The thermal barrier assembly of claim 22, wherein the at least one heat dissipating structure comprises at least one extension member extending from a planar rear surface for removably engaging with ends of the first partition structure, the second partition structure, and the thermal shield.

\* \* \* \* \*